United States Patent
Abu-Shukhaidem et al.

(10) Patent No.: US 6,324,272 B1
(45) Date of Patent: Nov. 27, 2001

(54) TELECOMMUNICATION CALLING PARTY NUMBER DETERMINATION AND MANIPULATION

(75) Inventors: Husam A. M. Abu-Shukhaidem; James L. Carter, both of Lisle; Todd Cartwright Morgan, Oak Park; Lei Qian; Marcus Eugene Stinson, both of Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/430,495

(22) Filed: Oct. 29, 1999

(51) Int. Cl.[7] .............................. H04M 1/56; H04M 15/06
(52) U.S. Cl. .............................. 379/142.06; 379/142.04; 379/142.14; 379/245; 379/142.01
(58) Field of Search ............................ 379/142, 120, 379/127, 354, 88.19, 88.21, 243, 245, 246, 247, 93.23, 142.01, 142.04, 142.06, 142.14

(56) References Cited

U.S. PATENT DOCUMENTS

| | | | |
|---|---|---|---|
| 5,506,894 | * | 4/1996 | Billings et al. ...................... 379/127 |
| 5,546,447 | * | 8/1996 | Skarbo et al. ....................... 379/142 |
| 5,859,901 | * | 1/1999 | Brendzel et al. .................... 379/114 |
| 5,991,383 | * | 11/1999 | Kucmerowski et al. ............ 379/142 |

* cited by examiner

*Primary Examiner*—Duc Nguyen
(74) *Attorney, Agent, or Firm*—Nancy R. Gamburd

(57) ABSTRACT

An apparatus, method and system are illustrated which provide for calling party number determination and manipulation, utilizing digit analysis. One of the switch embodiments includes a network interface, a memory, and a processor. The network interface receives an incoming message having a received calling party number and transmits an outgoing message. The memory stores, as a database module, a plurality of digit trees for digit analysis and a plurality of available manipulations. The processor includes instructions to perform digit analysis of the received calling party number to determine a pattern match and to determine a selected manipulation of the plurality of available manipulations, and to perform the selected manipulation on the received calling party number to form a modified calling party number. The processor includes further instructions, when a pattern match has been determined, to direct the network interface to transmit the modified calling party number in the outgoing message, and when a pattern match has not been determined, to direct the network interface to transmit the received calling party number in the outgoing message. The database module may be modified for calling party number format variability, such as for international use.

45 Claims, 4 Drawing Sheets

TELECOMMUNICATION CALLING PARTY NUMBER DETERMINATION AND MANIPULATION

FIELD OF THE INVENTION

The present invention relates in general to telecommunication systems, and more particularly, to an apparatus, method and system for telecommunication calling party number determination and manipulation.

BACKGROUND OF THE INVENTION

With the advent of increasingly sophisticated telecommunication systems, consumers are increasingly offered a wider array of features and options for telecommunication services. For example, in a feature typically referred to as caller identification ("ID"), the telephone number of the calling party (also referred to as the "A party") may be displayed on a telephone or other device to the called party (also referred to as the "B party"). In these circumstances, the telephone number displayed generally has not been modified or manipulated; rather, the calling party telephone number is displayed in a form exactly as transmitted by the originating switching center. In other circumstances, where the originating switching center does not transmit sufficient caller identification information, a calling party telephone number may not be displayed at all.

In the prior art, because the calling party telephone number is displayed exactly as transmitted by the originating switching center, or may not be displayed at all, other advanced telecommunication features may be unavailable. For example, such systems do not include a digit "1" as a prefix for a telephone number for a different area code. Accordingly, without manipulation of the transmitted calling party number, a feature such as an automatic dial back (or automatic call return) may be rendered nonfunctional; without the addition of digit "1" as a dialing prefix, an automatic call return of the calling party number as displayed may not work to place the returned call.

As a consequence, a need remains to provide calling party telephone number determination and manipulation. Such provision of a manipulated calling party telephone number should be automatic, and should enable the automatic use of other advanced telecommunication features, such as automatic call return and automatic storage of telephone numbers. In addition, such provision of a manipulated calling party telephone number should be user transparent and user friendly, should be available in both wireline and wireless communication systems, and should allow implementation across different international telecommunication systems.

SUMMARY OF THE INVENTION

The apparatus, system and method of the present invention determine and provide a manipulated calling ("A") party telephone number ("CPN") which enables the automatic use of other advanced telecommunication features, such as automatic call return and automatic storage of telephone numbers. Highly significant, the manipulated calling party telephone number embodiments of the present invention may also be implemented within and across any type of dialing format or plan utilized internationally or within any given country, without a need to change the software for each different country. In addition, the manipulated calling party telephone number embodiments of the present invention are user friendly and user transparent, and may be utilized in both wireline and wireless communication systems, independently of any transmission or signaling protocol (i.e., independently of protocols that support transmission of CPN information).

The various embodiments employ digit analysis on the calling party number, to determine a pattern match and available (digit) string manipulations, to manipulate the calling party number into a desired format suitable for advanced functionality. The available string manipulations (or available digit manipulations), are highly general and include manipulations such as appending, deleting, substituting, translating, transposing, and so on. The available string manipulations apply to a generalized sense of "digit", which may include any keypad button, digit or function, such as numerical digits 0 through 9, # and *. (For ease of reference, any such keypad button, digit or function is simply and generally referred to herein as a digit.) For example, available manipulations may include, as typical examples, appending or deleting an area code prefix to the received calling party; appending a "1" prefix to the received calling party number; appending location information to the received calling party number; appending exchange digits to the received calling party number; substituting digits in the received calling party number; translating digits in the received calling party number; translating a "*" in the received calling party number into a numerical sequence; transposing digits in the received calling party number; and inserting digits in the received calling party number.

One of the switch embodiments includes a network interface, a memory, and a processor coupled to the network interface and the memory. The network interface receives an incoming message (and/or an incoming call leg) having a received calling party number and transmits an outgoing message (and/or an outgoing call leg). The memory stores, as a database module, a plurality of digit trees for digit analysis and a plurality of available digit manipulations. The database module may be modified for calling party number format variability, for international use.

The processor includes instructions to perform digit analysis of the received calling party number to determine a pattern match and to determine a selected manipulation of the plurality of available (string) manipulations, and to perform the selected manipulation on the received calling party number to form a modified calling party number. The processor includes further instructions, when a pattern match has been determined, to direct the network interface to transmit the modified calling party number in the outgoing message (or outgoing call leg), and when a pattern match has not been determined, to direct the network interface to transmit the received calling party number in the outgoing message (or outgoing call leg).

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
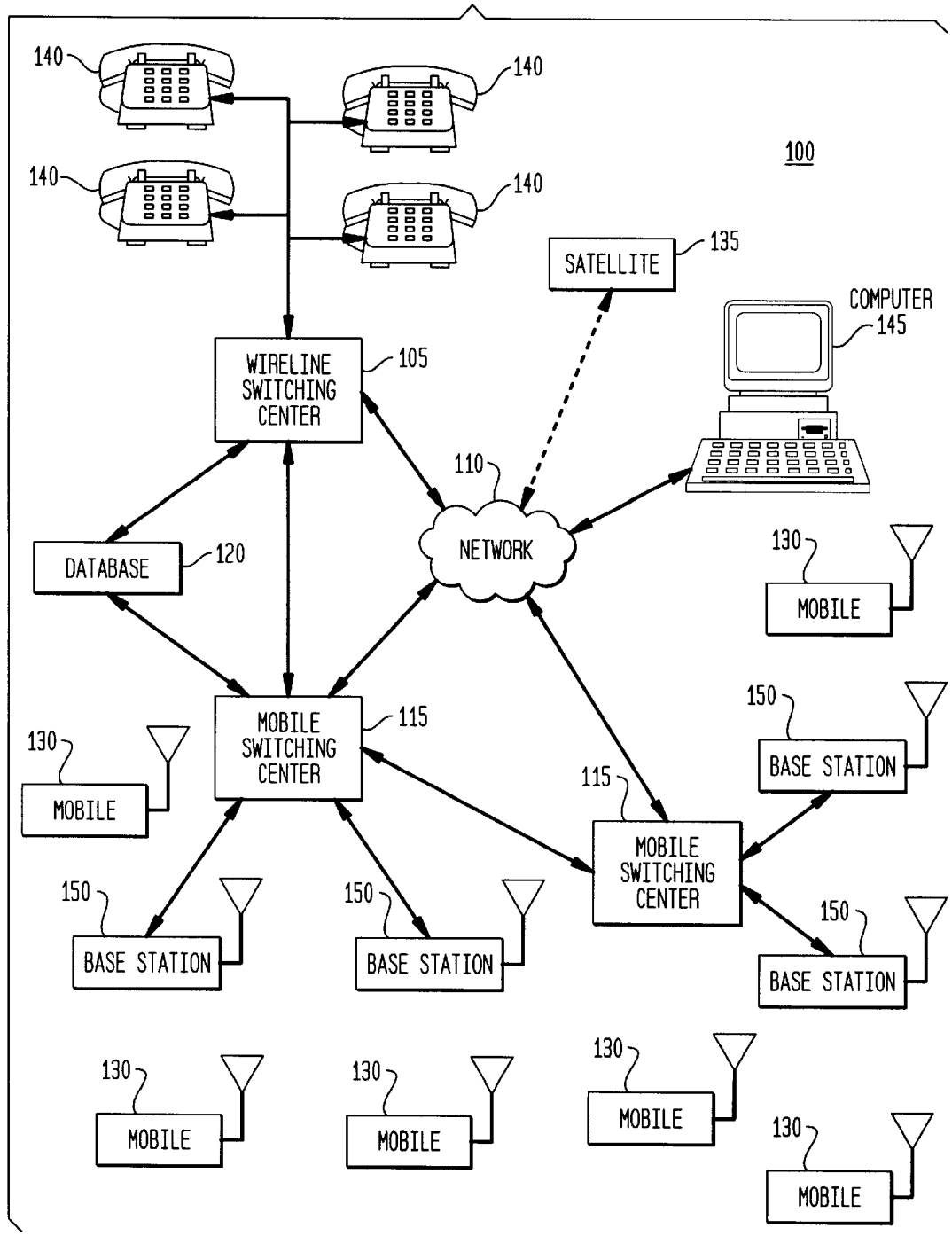
FIG. 1 is a block diagram illustrating a system embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide calling party telephone number determination and manipulation. In accordance with the present invention, an apparatus, system and method are illustrated which determine and provide a manipulated calling party telephone number which enables the automatic use of other advanced telecommunication features, such as automatic call return and automatic storage of telephone numbers. In addition, the manipulated calling party telephone number embodiments of the present invention are user friendly and user transparent, and may be utilized in both wireline and wireless communication systems.

A significant feature of the various embodiments of the present invention is its modularity, allowing for significant variability in format and features across different countries and markets. The manipulated calling party telephone number embodiments of the present invention may also be implemented within and across any type of dialing format or plan utilized internationally or within any given country, without software changes or revisions. Any such variation in telephone number format, such as country specific formats, may be accommodated by corresponding population of the database.

FIG. 1 is a block diagram illustrating a first system embodiment 100 in accordance with the present invention. The system 100 includes one or more mobile switching centers ("MSCs") 115 and one or more wireline switching centers 105 (individually and collectively referred to as switching centers or switches), which may also be connected via trunk and signaling lines (or other data links) to each other and to a broader network 110, such as a PSTN or ISDN network providing multiple telecommunication connections to other locations, such as providing a link to satellite 135 or computer 145. The system 100 may also include a database 120, which for purposes of explanation is illustrated as external to the various switches, but which is preferably internal to and included within the various switches 105 and 115.

The wireline switching center 105 is also generally connected to a plurality of telephones 140 or other customer premise equipment, while via base stations (cell sites) or other wireless transceivers 150, the MSCs 115 typically have a wireless link to a plurality of various mobile units 130 within a particular geographic region, such as cellular telephones or portable computers with wireless modems, for voice and data communication. In addition, while the wireline and mobile switching centers 105 and 115 are usually physically separated due to regulatory and other historical reasons, these switching centers may also be combined into one or more switching centers having both wireline and wireless functionalities.

In accordance with the present invention, and as discussed in greater detail below with reference to FIGS. 3 and 4, one of the various switches 105 or 115 may receive an incoming message (and/or incoming call leg) for an incoming telecommunication. The incoming message may have any format according to any applicable wireline or wireless communications protocol, such as an ISUP message or an initial address message ("IAM"), or the various ANSI-41 messages for wireless links (for both local and roaming mobile units 130). (The various embodiments of the invention, such as system 100, are independent of and from any particular landline or mobile protocol or methodology, such as transmission or signaling protocols, including CDMA, TDMA, AMPs, or GSM, provided the protocol or methodology supports transmission of calling party number information.) The incoming message, having any such format, typically includes information pertaining to a calling ("A") party (telephone) number ("CPN"), such as ASCII encoded CPN digits. The incoming message is typically transmitted or routed to the switch 105 or 115 by one or more other switches through the network 110. As such, in the various preferred embodiments of the invention, the various switches 105 or 115 may be considered terminating switches, with the features of the present invention implemented as terminating features. Additionally, the various switches 105 or 115 may be considered tandem or intermediate switches, providing these features at a switching or call path level intermediate between origination and termination. As discussed in greater detail below, the features of the invention may also be extended to originating switches.

Continuing to refer to FIG. 1, when one of the switches 105 or 115 receives such an incoming message having CPN information, the switch accesses its internal database (or memory), and in conjunction with its processing capability (illustrated with reference to FIG. 2), performs digit analysis on the received CPN, to determine a pattern match (as discussed in greater detail below with reference to FIGS. 3 and 4). When there is a pattern match, the processing capability of the switch further determines the available or allowable string manipulations which may be performed on the CPN, and performs one or more of the manipulations, in various combinations, such as appending a prefix (prepending) area code to the received CPN, followed by appending a "1" prefix to the received CPN having the prepended area code, or other manipulations such as deleting an area code prefix from the received CPN or adding an exchange sequence to the received CPN. The resulting, modified or manipulated CPN is then transmitted in an outgoing message (or call leg) to the called ("B") party. As discussed in greater detail below, when there is no pattern match from digit analysis of the CPN, the CPN as received (without modification) is transmitted in the outgoing message to the called party. In addition, if instead of either match or no match information, an error message is returned, then the switch omits any reference to a CPN in the outgoing message transmitted to the called party. The transmitted CPN, preferably as modified in accordance with the present invention, may then be utilized by the called party (or the customer premise equipment of the called party), for any number of different purposes, as discussed below. An exemplary flow diagram for such calling party number determination and manipulation by a switch 105 or 115 is illustrated in FIG. 3.

For example, in various networks, an originating switch may transmit only "XXXX" as a CPN (where "X" represents a digit from 0 to 9). Under these circumstances, a terminating or tandem switch in accordance with the present invention will, from a digit analysis pattern match, determine that an exchange number addition is an available manipulation. The switch will then prepend an exchange number sequence, such as "NXX" (where "N" represents a digit from 2 to 9), resulting in a modified CPN of "NXX-XXXX", which is then transmitted as the CPN to the called party for subsequent utilization.

Also for example, telephone numbers have a variety of formats in various countries. For example, a telephone number in England may have a format of 01XX-XXX-XXXX. In the event only the last seven digits of a CPN are received, a terminating switch in accordance with the present invention will, from a digit analysis pattern match, determine that an area code number addition is an available manipulation. The switch will then prepend an area code number, such as "01XX", resulting in a modified CPN of "01XX-XXX-XXXX", which is then transmitted as the CPN to the called party for subsequent utilization.

In addition to string manipulation of numerical digits, depending upon the chosen embodiment, other types of information may also be included within the modified CPN to be transmitted to the called party for subsequent utilization, such as time of day or location information. For example, with the proliferation of new area codes, service providers may also provide city or state designations, such as prepending "Maryland" to a CPN having a 301 area code. In other circumstances, string manipulation of calling party numbers may be utilized by a service provider to create compatibility between equipment of different vendors, for example, converting digit and character sequences for call forwarding to a different numeric sequence recognizable by other equipment (e.g., switches or voice mail equipment), such as modifying a CPN of "*70" by deleting *70, utilizing another code as a prefix, followed by adding a 10 digit telephone number sequence as a suffix.

As illustrated above, this modification of the CPN occurs transparently to the various users (such as the calling or called parties). Also in accordance with the present invention, the manipulated or modified calling party number may then be utilized by the called party for any of the various advanced features which may be available within the system 100. For example, the modified CPN may be utilized directly, without further modification by the called party, for automatic call back. Again, also for example, the modified CPN may be utilized directly, without further modification by the called party, for storage in a directory, for speed dialing or other calling purposes. The modified CPN may also be displayed, for caller identification purposes. Numerous additional applications also may be apparent, particularly with the increasing development of advanced calling features.

Figure 2:
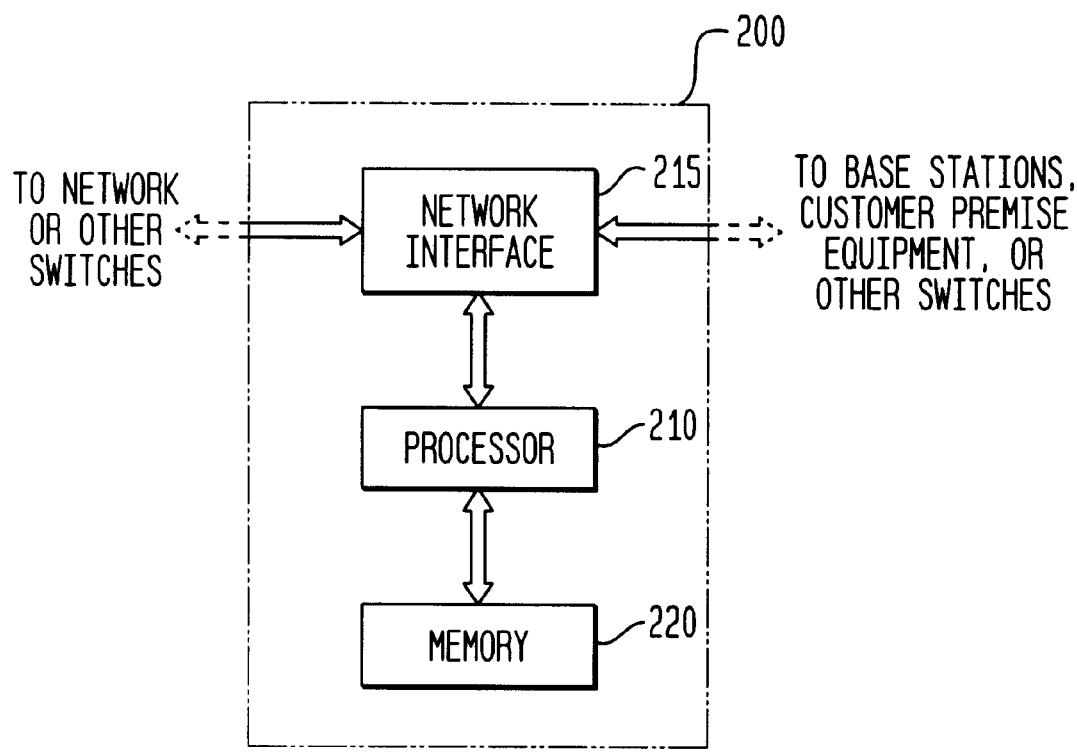
FIG. 2 is a block diagram illustrating an apparatus embodiment in accordance with the present invention.

FIG. 2 is a block diagram illustrating an apparatus embodiment 200 in accordance with the present invention. Such an apparatus 200 preferably may be included within a switching center, such as an MSC 115 or wireline switching center 105, or otherwise included within the system 100. The apparatus 200 includes a processor 210, a network interface 215, and a memory 220. The network interface 215 is utilized to receive an incoming message and to transmit an outgoing message, such as to receive a message containing calling party information, and to transmit a response message containing manipulated calling party telephone number information in accordance with the present invention. These various incoming and outgoing messages may be independent from, or may be included within, the various voice path call legs or connections routed between and among the switches. The network interface 215 may be a message link, such as an ANSI-41 message link, or may be part of the switching fabric of a switch 105 or 115, such as a digital cellular switch ("DCS"), and may be configured to operate with any particular communication or network protocol. The memory 220 may be a magnetic hard drive, an integrated circuit, an optical storage device, or any other type of data storage apparatus. The memory 220 is used as a database to store information pertaining to dialing classes, dialing plans, digit tables, dialing patterns, allowable or selected string manipulations and modifications, and program instructions, as discussed in greater detail below.

Continuing to refer to FIG. 2, the processor 210 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. For example, the processor 210 may be one of the components of the executive processor of a switch, such as an ECP (Executive Cellular Processor) or ECPC (Executive Cellular Processor Complex). As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIGS. 3 and 4, with associated memory, such as microprocessor memory or additional RAM, ROM, EPROM or $E^2$PROM. The methodology of the invention, as discussed above with reference to FIG. 1 and as discussed below with reference to FIGS. 3 and 4, may be programmed and stored, in the processor 210 with its associated memory and other equivalent components, as a set of program instructions for subsequent execution when the processor 210 is operative (i.e., powered on and functioning).

Figure 3:
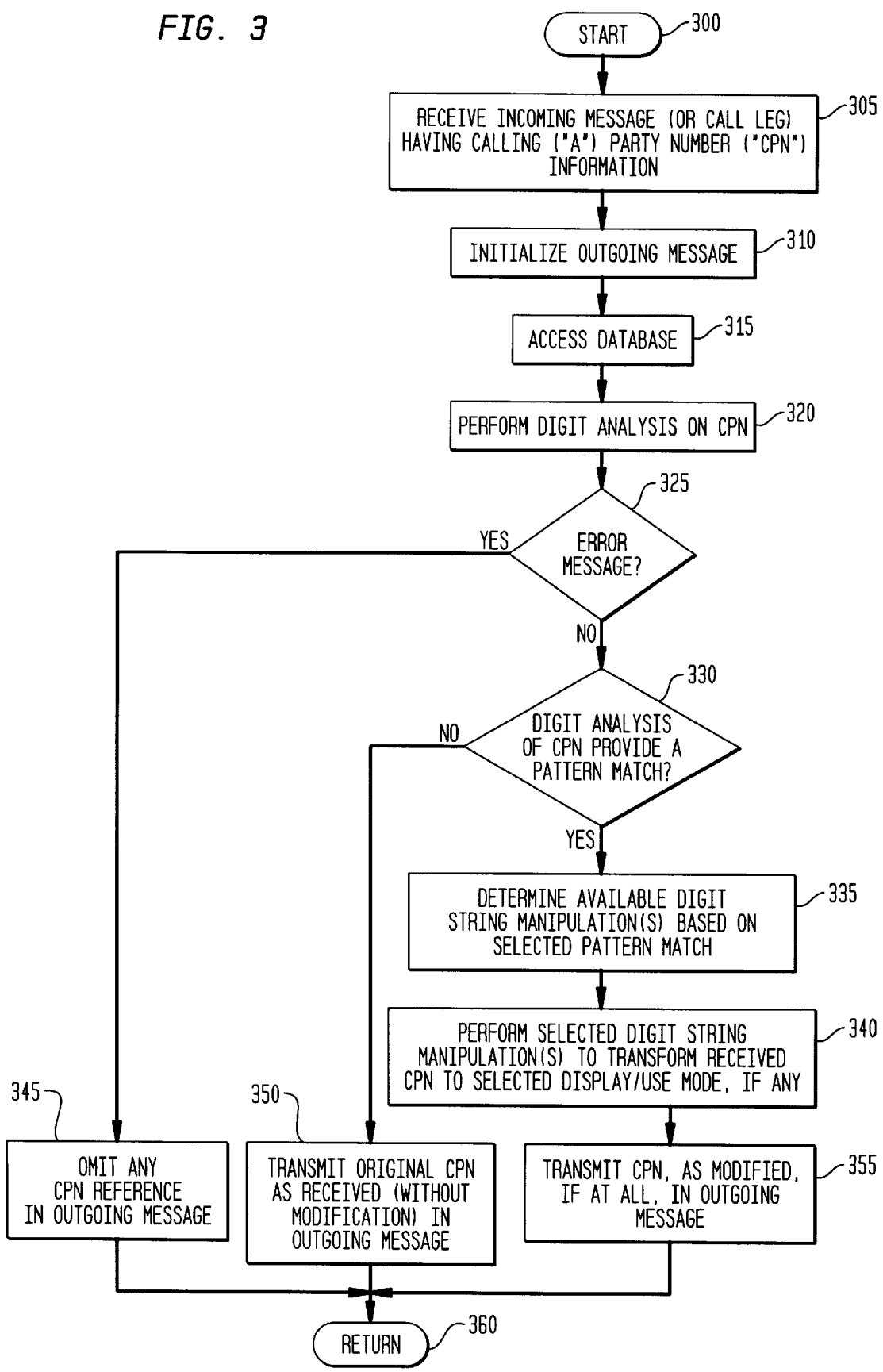
FIG. 3 is a flow diagram illustrating a method to determine and modify a calling party telephone number in accordance with the present invention.

FIG. 3 is a flow diagram illustrating a method to determine and modify a calling party telephone number in accordance with the present invention. The method begins, start step 300, with the reception of an incoming message, such as an incoming ISUP or ANSI-41 message, having calling ("A") party number information, step 305. As mentioned above, such reception of an incoming message is preferably performed by a terminating (or intermediate (tandem)) switch, such as switch 105 or 115. Next, in step 310, an outgoing message is initialized, and in step 315, a database (memory) is accessed, such as processor 210 accessing a database stored in memory 220. As mentioned above, and as discussed in greater detail below, the database stores information pertaining to dialing classes, dialing plans, digit tables, dialing patterns, and allowable or selected string modifications. This information has preferably been converted to a "tree" format for digit analysis, such that every allowable or anticipated digit is represented in a node, with successive allowable or anticipated digits represented as branches from the node, as illustrated in FIG. 4. A successful tree traversal, as illustrated in FIG. 4, represents a pattern match for digit analysis of the CPN (step 330, below).

Continuing to refer to FIG. 3, digit analysis is then performed on the received CPN, step 320. Based on this digit analysis, the method may find a pattern match, may find no pattern match, or may return an error message. If an error message is returned in step 325, such as an internal digit analysis failure due to a data population error or omission, then no CPN is transmitted in the outgoing message to the called party, step 345. When there is no error message in step 325, the method proceeds to step 330 to determine whether digit analysis of the received CPN provided a pattern match, step 330. For example, a received CPN of "713-8044" may, through digit analysis, be matched to an allowable pattern of "713-XXXX". If no pattern match is found in step 330, then the method proceeds to step 350, and transmits the CPN, as received without modification, in the outgoing message to the called party.

When a digit analysis has provided a pattern match in step 330, the method proceeds to step 335 and determines the available or desired string manipulations corresponding to or based upon the particular, selected pattern match. For example, the pattern match of "713-XXXX" for a received CPN of "713-8044" may provide corresponding, available string manipulations of appending (prepending) a "630" digit sequence or string as an area code prefix, followed by appending a "1" prefix. Next, in step 340, the selected digit string manipulations are performed, to transform the received CPN to a selected display or use mode. Also for continuing the example of the pattern match of "713-XXXX" for a received CPN of "713-8044", when the terminating switch is for a neighboring "312" or "773" area code, the selected display or use mode may include directions to append both a prefixed "1" and a prefixed area code for all calling party numbers from other area codes to, for example, provide for automatic call back as an anticipated use mode. As a consequence, the received CPN may be modified accordingly, utilizing the selected string manipulations to result in a modified CPN of "1-630-713-8044". Conversely, for the same pattern match of "713-XXXX" for a received CPN of "713-8044", terminating switches within the same area code may provide for a different display or use mode, providing directions to maintain the received CPN as is, without such appending, resulting in a CPN of "713-8044" for transmission to the called party. As a consequence, depending upon the string manipulations selected for a particular pattern match, the received CPN may or may not be subject to actual modification for transmission to the called party. Next, in step 355, the CPN, as modified or revised, if at all, is transmitted in an outgoing message to the called party, for subsequent use as mentioned above. Following any of the steps 345, 350 or 355, the method may end, return step 360.

Figure 4:
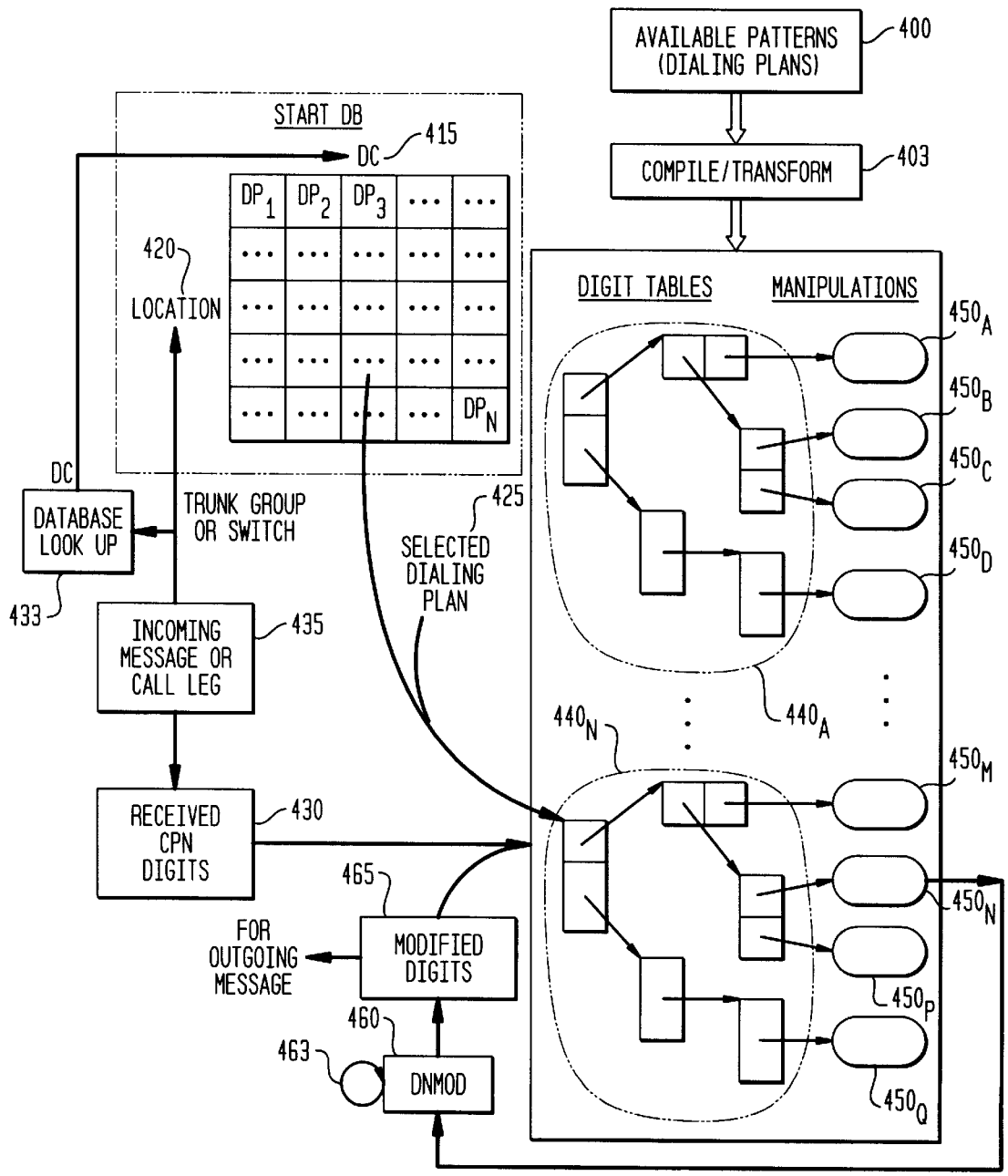
FIG. 4 is a block and flow diagram illustrating digit analysis for calling party telephone number determination and manipulation in accordance with the present invention.

FIG. 4 is a block and flow diagram illustrating digit analysis for calling party telephone number determination and manipulation in accordance with the present invention. An especially novel feature of the present invention is the use of digit analysis on a calling (A) party number; in the prior art, digit analysis has been utilized solely on called (B) party numbers to, for example, determine a valid number pattern and to route the corresponding telecommunication call leg (voice path).

Referring to FIG. 4, a group of available CPN patterns (and/or dialing plans) (400) are determined for use in any given switch or switch location, and are utilized in advance of digit analysis to pre-populate the database (memory 220). As mentioned above, these patterns typically have a format (in the United States) of "NXX-NXX-XXXX", such as "630-713-XXXX", and may have any of the various formats and patterns used throughout the world. For example, a typical switch in Naperville, Ill. may have CPN patterns such as "630-713-XXXX", "630-929-XXXX", "312-583-XXXX", and so on. In the preferred embodiment, up to 40,000 different patterns may be utilized.

This pre-population of the database with expected CPN patterns results in another significant feature of the present invention, namely, modularity. No software is required to be modified to customize the various embodiments for differing international uses; instead, this is accomplished through use of a different database module. By prepopulating the database with the expected CPN patterns for the various switches within a given country, the various embodiments of the invention are thereby automatically customized for use in any particular country, while the software may remain the same.

Prior to any digit analysis, the available CPN patterns (400) are converted into digit tables (or trees), for increased speed of analysis. In the preferred embodiment, a "dialing plan" is defined as a collection or set of patterns. All of these patterns of the particular set are then compiled together and transformed into a single tree corresponding to the particular dialing plan (403). These digit tables (as trees) are then a collection or group of corresponding nodes, in which each digit position of an allowed pattern is represented in a node or group of nodes, illustrated as digit trees or tables $440_A$ through $440_N$ (individually and collectively referred to as digit trees 440). Traversal of these digit trees, as digit analysis, provides the pattern matching of steps 320 and 330 of FIG. 3. Multiple patterns may pass through a given node, and different patterns may typically share initial levels of the same tree. Each pattern corresponds to at least one, and possibly multiple, paths through a tree (e.g., a "wild card" or limited "don't care" X may create a multiple path case). For example, using set (or character class) notation, [2–3, 6]XXX creates a multiple path case of 2XXX, 3XXX, and 6XXX. As another example using transitive closure notation, in which "+" means one or more digits, 0+ creates a multiple path case of 0 followed by any number (e.g., 0X, 0XXX, 0-XXX-XXX-XXXX). The terminations or "leaves" of each tree provide a terminus for a pattern match, and provide other information corresponding to the pattern match which, in this case, are the allowable or preferable string manipulations $450_A$ through $450_Q$ for a given pattern match (individually and collectively referred to as available string manipulations 450).

In addition, also prior to digit analysis, entry points or indices are created, which provide an initial beginning point for the digit analysis of a given CPN, illustrated as start database 405 in FIG. 4. These entry points or indices may be created in any number of various ways. In a current embodiment, these entry points or indices are created by identifying various switches of incoming messages and call legs. In the preferred embodiment, for greater specificity (finer granularity), these entry points or indices are created by identifying both switches and trunk groups of these incoming messages and call legs. More specifically, as illustrated in FIG. 4, locations (420) are defined, which in the preferred embodiment are identifications of various switches or trunk groups of incoming messages and call legs. Dialing classes (DC) 415 are also defined, which in the preferred embodiment are identifications of the trunk groups or switches of these incoming call legs and/or messages (dialing classes also may be otherwise defined by a service provider). For each such switch, or for each combination of switch and trunk group of incoming messages or call legs, a corresponding dialing plan ("DP") (425) is associated or defined (illustrated as $DP_1$ through $DP_N$). The selection of a dialing plan (425) is then utilized as an entry point into the digit trees (tables) 440 utilized for the digit analysis of the CPN, as the selected dialing plan corresponds to a given tree formed by a compilation of all CPN patterns of the dialing plan.

Referring to FIG. 4, with the reception of an incoming message and/or incoming call leg (435), the start database 405 is accessed, and based on the switch of an incoming message and/or incoming call leg, or based on a combination of the switch and trunk group of an incoming message and/or incoming call leg, a dialing plan (425) is selected as an initial entry point into the digit tables (440), providing a selected digit tree, illustrated as digit tree $440_N$. In the preferred embodiment, additional steps are utilized, in which based on the switch or trunk group, a dialing class (415) is selected through a database lookup (433), and based on the (terminating) trunk group or switch, a location (420) is determined; the combination of dialing class and location (i.e., a combination of switch and trunk group) in turn selects the dialing plan (425) from the start database (405) as the initial entry point into the digit tables (440), also providing a selected digit tree, illustrated as digit tree $440_N$. The received CPN digits (430) are then utilized to traverse the selected digit tree ($440_N$), to determine a pattern match. Typically, three to six digits are traversed, for typical pattern matches such as "630-713-XXXX" or "583-XXXX", with the "X" providing a limited, numerical "don't care" variable in the pattern matching. As illustrated in FIG. 4, this digit analysis results in a pattern match and selection of available string manipulations $450_N$. To conserve memory space, the various leaf nodes (450) may be shared across the various trees (dialing plans). Following this determination of the available string manipulations, the selected string modifications are performed (DNMOD 460), and may include a sequence of chained manipulations (463), resulting in a potentially modified CPN digit string (465). This potentially modified CPN digit string (465) may be fed back into the selected digit tree $440_N$ (or another digit tree 440) for further discrimination or further pattern matching, resulting in potential selection of another pattern match and resulting digit string manipulations (if any). The potentially modified CPN digit string (465) is then utilized for transmission to the called party (FIG. 3, step 355).

The available string manipulations (450), for any selected pattern match, may be defined by the service provider, to modify or translate a received CPN into any desired format. In the preferred embodiment, the available manipulations include appending, deleting, inserting, transposing, and translating, and may be implemented quite generally or specifically, as desired by the service provider. As mentioned above, some of the more common modifications include appending (prepending) an area code prefix, appending a "1" prefix, appending an exchange prefix, appending a country code, appending a suffix such as "*" or "#", and so on. (Some manipulations, such as appending or deleting a country code having a potentially variable length, may additionally require a table look up step.) In the preferred embodiment, several additional types of manipulations are utilized. First, in addition to appending (prepending), deletions of various numbers are also utilized, such as deleting area codes, exchanges and country codes. Second, deletions of various numbers and digit substitutions may also be utilized, for example, to delete an area code and replace it by a different area code. Number substitution (DNSUB) may also be utilized, in which a calling party number is completely replaced. Also as indicated above, these various manipulations may also be linked together, with one manipulation following another, such as appending an area code followed by appending a "1". Other typical manipulations may include digit translation, transposition, and insertion.

Also as mentioned above, the digit analysis and CPN manipulation of the present invention is applicable broadly, including significantly more than analysis and manipulation of the various numeric digits 0 through 9, and may include analysis and manipulation of any keypad or keyboard function, button or alphabet, including any of the various 12 and 16 button functions or numbers of the current, commonly used keypads. In addition, the various manipulations may also append, insert, and otherwise manipulate non-dialable information, such as appending "MD" following a Maryland telephone number. Such non-dialable information may also be included within the pattern matching discussed above.

In addition to available string manipulations, the "other information" of the "leaves" (terminations 450) of the digit trees 440 may include various conditions or commands. In the preferred embodiment, one such command and/or condition includes re-analyzing the modified CPN, as mentioned above. In addition, such re-analysis may include digit analysis of the modified CPN in the same dialing plan (i.e., digit analysis beginning at the same entry point or root of the same digit tree previously utilized), or digit analysis of the modified CPN in a different dialing plan (i.e., digit analysis beginning at a different entry point or root of a different digit tree than that previously utilized). The service provider may also implement additional functionality within the CPN digit modification (DNMOD 460) functionality of the present invention, such as expanding CPN determination and manipulation to originating switches.

A significant feature of the various embodiments of the present invention is its modularity, allowing for significant variability in format and features across different countries and markets. Any such variation in telephone number format, such as country specific formats, may be accommodated by corresponding population of the database, without requiring any software changes. For example, changes in dialing plans and dialing patterns, as compiled into a tree format, results in a change in the population of the database, which may provide corresponding format variability for these different countries and markets.

Another type of modularity of the present invention is the utilization of predefined dialing plans, the ability to link dialing plans together, and the use of allowable modifications (DNMODs). The use of these structures or elements also provides for ease of variation, incorporation of new features, and subsequent updating.

Numerous other advantages of the various embodiments of the present invention may be apparent. The apparatus, system and method of the present invention determine and provide a manipulated calling party telephone number which enables the automatic use of other advanced telecommunication features, such as automatic call return and automatic storage of telephone numbers. In addition, the manipulated calling party telephone number embodiments of the present invention are user friendly and user transparent, and may be utilized in both wireline and wireless communication systems, independently of any transmission or signaling protocol. The manipulated calling party telephone number embodiments of the present invention may also be implemented within and across any type of dialing format or plan utilized internationally or within any given country, without changing software.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for calling party number determination and manipulation by a network switch, the method comprising:
   (a) receiving an incoming message having a received calling party number;
   (b) determining an entry point of a database module from at least one of a plurality of communication parameters, the plurality of communication parameters including a switch identification of the incoming message and a trunk group identification of the incoming message;

(c) commencing with the determined entry point of the database module, performing digit analysis of the received calling party number to determine a pattern match and to determine a selected manipulation;

(d) performing the selected manipulation on the received calling party number to form a modified calling party number; and (e) when a pattern match has been determined, transmitting the modified calling part number in an outgoing message.

2. The method of claim 1, further comprising:

(f) when a pattern match has not been determined, transmitting the received calling party number in the outgoing message.

3. The method of claim 1, further comprising:

(g) when an error has occurred, transmitting no calling party number information in the outgoing message.

4. The method of claim 1, further comprising:

determining a plurality of anticipated calling party number patterns and a plurality of anticipated manipulations;

transforming the plurality of anticipated calling party number patterns and the plurality of anticipated manipulations into a plurality of corresponding digit trees for digit analysis traversal.

5. The method of claim 4, further comprising:

storing the plurality of corresponding digit trees and plurality of anticipated manipulations as the database module.

6. The method of claim 5, further comprising:

modifying the database module for format variability.

7. The method of claim 1, wherein the selected manipulation includes appending an area code prefix to the received calling party number.

8. The method of claim 1, wherein the selected manipulation includes deleting an area code prefix from the received calling party number.

9. The method of claim 1, wherein the selected manipulation includes appending a "1" prefix to the received calling party number.

10. The method of claim 1, wherein the selected manipulation includes appending location information to the received calling party number.

11. The method of claim 1, wherein the selected manipulation includes appending an area code prefix to the received calling party number to form an initially modified calling party number, followed by appending a "1" prefix to the initially modified calling party number to form the modified calling party number.

12. The method of claim 1, wherein the digit analysis of step (b) further determines a plurality of selected manipulations, and wherein the plurality of selected manipulations are selected from a set of manipulations, the set of manipulations including appending, deletion, digit substitution, calling party number substitution, translation, transposition, and insertion.

13. An apparatus for calling party number determination and manipulation by a network switch, the apparatus comprising:

a network interface for receiving an incoming message having a received calling party number and for transmitting an outgoing message;

a memory, the memory storing a database module; and a processor coupled to the network interface and to the memory, wherein the processor includes instructions to determine an entry point of the database module from at least one of a plurality of communication parameters, the plurality of communication parameters including a switch identification of the incoming message and a trunk group identification of the incoming message, and commencing with the determined entry point of the database module, to perform digit analysis of the received calling party number to determine a pattern match and to determine a selected manipulation, to perform the selected manipulation on the received calling party number to form a modified calling party number, and when a pattern match has been determined, to direct the network interface to transmit the modified calling party number in the outgoing message.

14. The apparatus of claim 13, wherein the processor includes further instructions, when a pattern match has not been determined, to direct the network interface to transmit the received calling party number in the outgoing message.

15. The apparatus of claim 13, wherein the processor includes further instructions, when an error has occurred, to direct the network interface to transmit no calling party number information in the outgoing message.

16. The apparatus of claim 13, wherein the processor includes filter instructions to transform a plurality of anticipated calling party number patterns and a plurality of anticipated manipulations into a plurality of corresponding digit trees for digit analysis traversal, and to store the plurality of corresponding digit trees and plurality of anticipated manipulations as the database module in the memory.

17. The apparatus of claim 16, wherein the processor includes further instructions to modify the database module for format variability.

18. The apparatus of claim 13, wherein the selected manipulation includes appending an area code prefix to the received calling party number.

19. The apparatus of claim 13, wherein the selected manipulation includes deleting an area code prefix from the received calling party number.

20. The apparatus of claim 13, wherein the selected manipulation includes appending a "1" prefix to the received calling party number.

21. The apparatus of claim 13, wherein the selected manipulation includes appending location information to the received calling party number.

22. The apparatus of claim 13, wherein the selected manipulation includes appending an area code prefix to the received calling party number to form an initially modified calling party number, followed by appending a "1" prefix to the initially modified calling party number to form modified calling party number.

23. The apparatus of claim 13, wherein the processor includes further instructions to determine a plurality of selected manipulations, and wherein the plurality of selected manipulations are selected from a set of manipulations, the set of manipulations including appending, deletion, digit substitution, calling party number substitution, translation, transposition, and insertion.

24. The apparatus of claim 13, wherein the apparatus is included within a terminating switch.

25. The apparatus of claim 13, wherein the apparatus is included within a tandem switch.

26. A system for calling party number determination and manipulation, the system comprising:

a database; and a switch coupled to the database, the switch for receiving an incoming message having a received calling party number and for transmitting an outgoing message, wherein the switch includes instructions to determine an entry point of the database from at least one of a plurality of communication parameters, the plurality of communication parameters including a switch identification of the incoming message and a trunk group identification of the incoming message, and commencing with the determined entry point of the database, to perform digit analysis of the received calling party number to determine a pattern match and to determine a selected manipulation, to perform the selected manipulation on the received calling party number to form a modified calling party number, and when a pattern match has been determined, to transmit the modified calling party number in the outgoing message.

27. The system of claim 26, wherein the switch includes further instructions, when a pattern match has not been determined, to transmit the received calling party number in the outgoing message.

28. The system of claim 26, wherein the switch includes further instructions, when an error has occurred, to transmit no calling party number information in the outgoing message.

29. The system of claim 26, wherein the switch includes further instructions to transform a plurality of anticipated calling party number patterns and a plurality of anticipated manipulations into a plurality of corresponding digit trees for digit analysis traversal, and to store the plurality of corresponding digit trees and plurality of anticipated manipulations as a module in the database.

30. The system of claim 29, wherein the switch includes further instructions to modify the database module for format variability.

31. The system of claim 26, wherein the selected manipulation includes appending an area code prefix to the received calling party number.

32. The system of claim 26, wherein the selected manipulation includes deleting an area code prefix from the received calling party number.

33. The system of claim 26, wherein the selected manipulation includes appending a "1" prefix to the received calling party number.

34. The system of claim 26, wherein the selected manipulation includes appending location information to the received calling party number.

35. The system of claim 26, wherein the selected manipulation includes appending an area code prefix to the received calling party number to form an initially modified calling party number, followed by appending a "1" prefix to the initially modified calling party number to form the modified calling party number.

36. The system of claim 26, wherein the switch includes further instructions to determine a plurality of selected manipulations, and wherein the plurality of selected manipulations are selected from a set of manipulations, the set of manipulations including appending, deletion, digit substitution, calling party number substitution, translation, transposition, and insertion.

37. The system of claim 26, wherein the switch is a terminating switch.

38. The system of claim 26, wherein the switch is a tandem switch.

39. The system of claim 26, wherein the switch incorporates the database.

40. A switch for calling party number determination and manipulation, the switch comprising:

a network interface for receiving an incoming message having a received calling party number and for transmitting an outgoing message;

a memory storing, as a database module, a plurality of digit trees for digit analysis and a plurality of available manipulations; and a processor coupled to the network interface and to the memory, wherein the processor includes instructions to determine an entry point of the database module from at least one of a plurality of communication parameters, the plurality of communication parameters including a switch identification of the incoming message and a trunk group identification of the incoming message, and commencing with the determined entry point of the database module, to perform digit analysis of the received calling party number to determine a pattern match and to determine a selected manipulation of the plurality of available manipulations, to perform the selected manipulation on the received calling party number to form a modified calling party number; the processor including firther instructions, when a pattern match has been determined, to direct the network interface to transmit the modified calling party number in the outgoing message; the processor including firther instructions, when a pattern match has not been determined, to direct the network interface to transmit the received calling party number in the outgoing message; and the processor including further instructions, when an error has occurred, to direct the network interface to transmit no calling party number information in the outgoing message.

41. The switch of claim 40, wherein the plurality of available manipulations includes: appending an area code prefix to the received calling party; deleting an area code prefix from the received calling party number; appending a "1" prefix to the received calling party number; appending location information to the received calling party number; appending exchange digits to the received calling party number; substituting digits in the received calling party number; translating digits in the received calling party number; transposing digits in the received calling party number; and inserting digits in the received calling party number.

42. The switch of claim 40, wherein the processor includes further instructions to transform a plurality of anticipated calling party number patterns and a plurality of anticipated manipulations into the plurality of digit trees, each digit tree of the plurality of digit trees having a plurality of terminations, each termination of the plurality of terminations having either at least one selected manipulation of the plurality of available manipulations or no manipulation.

43. The switch of claim 40, wherein the processor includes further instructions to modify the database module for calling party number format variability.

44. The switch of claim 40, wherein the switch is a terminating switch.

45. The switch of claim 40, wherein the switch is a tandem switch.

* * * * *